US012189739B2

(12) United States Patent  
Williams et al.

(10) Patent No.: US 12,189,739 B2  
(45) Date of Patent: Jan. 7, 2025

(54) METHODS FOR IMPROVING THE PERFORMANCE OF NEURAL NETWORKS USED FOR BIOMETRIC AUTHENTICATION

(71) Applicant: My Voice AI Limited, London (GB)

(72) Inventors: Jennifer Williams, London (GB); Moez Ajili, London (GB)

(73) Assignee: MY VOICE AI LIMITED, London (GB)

(*) Notice: Subject to any disclaimer, the term of this patent is extended or adjusted under 35 U.S.C. 154(b) by 434 days.

(21) Appl. No.: 17/466,526

(22) Filed: Sep. 3, 2021

(65) Prior Publication Data

US 2022/0405363 A1 Dec. 22, 2022

(30) Foreign Application Priority Data

Jun. 18, 2021 (EP) .................................... 21305841

(51) Int. Cl.
*G06F 21/32* (2013.01)
*G06F 3/16* (2006.01)
*G06N 3/02* (2006.01)

(52) U.S. Cl.
CPC .............. *G06F 21/32* (2013.01); *G06F 3/165* (2013.01); *G06N 3/02* (2013.01)

(58) Field of Classification Search
CPC ............ G06F 21/32; G06F 3/165; G06F 3/16; G06N 3/02
See application file for complete search history.

(56) References Cited

U.S. PATENT DOCUMENTS

| 9,824,692 | B1 * | 11/2017 | Khoury | ................... G10L 17/18 |
| 2005/0281439 | A1 * | 12/2005 | Lange | .................... G06V 40/10 382/115 |
| 2011/0261257 | A1 * | 10/2011 | Terry | ............. H04N 21/234318 348/E9.034 |
| 2018/0376234 | A1 * | 12/2018 | Petrank | ................ H04R 1/1083 |

(Continued)

FOREIGN PATENT DOCUMENTS

| CA | 3040971 A1 * | 4/2018 | ............. G06F 16/50 |
| CN | 112529029 A | 3/2021 | |
| CN | 116564315 A * | 8/2023 | |

(Continued)

OTHER PUBLICATIONS

Nainan Sumita et al., "Enhancement in speaker recognition for optimized speech features using GMM, SVM, and 1-D CNN", International Journal of Speech Technology, Kluwer, Dordrecht, NL, vol. 24, No. 4, Nov. 13, 2020, pp. 809-822.

(Continued)

*Primary Examiner* — Jayesh M Jhaveri
(74) *Attorney, Agent, or Firm* — ARENTFOX SCHIFF LLP

(57) ABSTRACT

A method of generating a biometric signature of a user for use in authentication using a neural network, the method comprising: receiving (110) a plurality of biometric samples from a user; extracting at least one feature vector using the plurality of biometric samples; using the elements of the at least one feature vector as inputs for a neural network; extracting the corresponding activations from an output layer of the neural network; and generating a biometric signature of the user using the extracted activations, such that a single biometric signature represents multiple biometric samples from the user.

12 Claims, 6 Drawing Sheets

(56) References Cited

U.S. PATENT DOCUMENTS

| | | | | |
|---|---|---|---|---|
| 2019/0311261 A1* | 10/2019 | Baldwin | ................ | G06N 3/08 |
| 2023/0253008 A1* | 8/2023 | Javeri | .................... | H04R 3/00 |
| | | | | 381/56 |

FOREIGN PATENT DOCUMENTS

| | | | | |
|---|---|---|---|---|
| EP | 3706117 B1 * | 5/2022 | ............ | G10L 13/00 |
| FR | 2893733 A1 * | 5/2007 | ............ | G06F 21/31 |

OTHER PUBLICATIONS

Krishnamoorthy P. et al., "Speaker recognition under limited date condition by noise addition", Expert Systems with Applications, vol. 38, No. 10, Apr. 15, 2011, pp. 13487-13490.

Phan Tuan et al., "Multi-task Learning based Voice Verification with Triplet Loss", 2020 International Conference on Multimedia Analysis and PAttern Recognition (MAPR), IEEE, Oct. 8, 2020, pp. 1-6.

Debnath Saswati et al., "Text-dependent speaker verification system : a Review", 2015 IEEE 9th International Conference on Intelligent Systems and Control (ISCO), IEEE, Jan. 9, 2015, pp. 1-7.

European Search Report issued in European Patent Application No. EP21305841 on Mar. 10, 2022.

Extended European Search Report issued Aug. 22, 2024 for European Patent Application No. 24168146.9, 10 pages total.

Makkinejad, N., et al., "Reduction in training time of a deep learning model in detection of lesions in CT", Feb. 2018, Progress in Biomedical Optics and Imaging, SPIE—International Society for Optical Engineering, vol. 10575, 11 pages total, XP060101265.

Shopovska, I, et al., "Efficient Training Procedures for Multi-Spectral Demosaicing", May 2020, Sensors, vol. 20, Issue No. 10, 23 pages total, XP055810706.

Stuhlsatz, A., et al., "Deep Neural Networks for Acoustic Emotion Recognition: Raising the Benchmarks", May 2011, IEEE International Conference on Acoustics, Speech and Signal Processing: (ICASSP 2011), 4 pages total, XP032001976.

\* cited by examiner

METHODS FOR IMPROVING THE PERFORMANCE OF NEURAL NETWORKS USED FOR BIOMETRIC AUTHENTICATION

CLAIM OF PRIORITY

The present Application for Patent claims priority to European Patent Application 21305841.5, entitled "METHODS FOR IMPROVING THE PERFORMANCE OF NEURAL NETWORKS USED FOR BIOMETRIC AUTHENTICATION" filed Jun. 18, 2021, which is assigned to the assignee hereof and hereby expressly incorporated by reference herein for all purposes.

TECHNICAL FIELD

The present invention relates to methods for improving the performance of neural networks used for biometric authentication, preferably for speaker authentication, including methods for determining a biometric signature of a user for use in biometric authentication using a neural network and methods for generating a set of biometric data for use in training a neural network.

BACKGROUND

Traditional methods for improving the performance of neural networks have tended to focus either on the architecture of the neural network itself or on the techniques used to train the neural network. While these have their advantages, there is a need to provide alternative solutions to the problem of how to improve the performance of neural networks, a problem which is especially acute in the field of biometric authentication where a high degree of accuracy is required.

In addition to requiring a neural network to accurately perform the task of authentication, there is an expectation among users that biometric authentication should happen quickly, and another important performance factor to consider is the speed with which biometric authentication occurs.

There may also be constraints on the design of a neural network used for biometric authentication. For example, the space available in memory to store the neural network and associate inference algorithms (referred to as the footprint of the neural network) may be limited. Likewise, the computing power available may be limited, often as a result of limitations on the electrical power available. This would be the case for a neural network implemented on-device, which will have a smaller footprint and lower power requirements than a neural network implemented in the cloud. In such cases, the options for modifying the architecture may be limited.

One approach taken to improve the performance of a neural network operating under the constraints of a smaller footprint and lower power requirements has been to optimise a neural network which isn't subject to those same constraints and to then configure the constrained neural network to mimic the behaviour of the unconstrained neural network. However, the effectiveness of this approach is limited.

One route towards improving the performance of a neural network used for biometric authentication is to improve how new users are enrolled, which is to say how a biometric signature for a user is determined.

Traditional biometric enrolment methods involve capturing a biometric sample of the user. When that sample is used to generate a biometric signal for the user, biometric authentication can fail, i.e. the user authentication will indicate that the user is not authorised, if the environment of the user is sufficiently different to the environment in which biometric enrolment was performed. For example, speaker recognition of a user may fail if the user is feeling tired, or is attempting to voice authentication in an environment with high levels of ambient noise.

Current biometric enrolment methods are therefore limited in that a biometric signature of a user lacks robustness to various types of environmental noise. This is especially problematic as authentication may take place in a variety of environments. In the case of speaker recognition, environmental noise takes the form of ambient sounds captured by the microphone of the user's device in the environment in which a user is attempting authentication, such as at home, on a train, or in a café or restaurant, to give just a few examples. Even within these environments, the environmental noise the neural network must be able to account for may vary. To take the example of a café, environmental noise could take the form of food preparation or could arise due to conversation among customers.

To the extent that environmental noise is accounted for, this usually a step of identifying the user's environment during authentication and accounting for environmental noise based on the noise expected to be present in that environment. However, this approach is prescriptive and, therefore, limited. It isn't possible when applying this approach to account for the noise found in new environments—for example, the environmental noise found in a city may be accounted for while the neural network may not have been adapted for the noise found in a coastal town—and nor can it account for the variation in environmental noise within the same category of environment, as illustrated in the example of a café.

The approach of accounting for environmental noise during authentication also leads to reduced performance of the neural network, at best leading to increased processing times during authentication and at worst leading to reduced accuracy. In the case of an on-device neural network with a constrained footprint, the limitations that constrained footprint places on the neural network mean that it may not be possible to account for environmental noise during authentication, and even if it is possible this reduces the scope for optimising other aspects of the neural network.

Accordingly, existing methods of biometric enrolment are unable to create a biometric signature that is robust enough to allow user recognition in a variety of environments.

Another route towards improving the performance of a neural network used for biometric authentication is to improve the data used to train the neural network.

It is often assumed that using more data to train a neural network will inevitably lead to better performance, and some neural networks do indeed require or utilise more training data compared to statistical machine learning methods. However, using increasingly large volumes of data to train a neural network does not always yield better results.

In the example of speaker authentication, using an overly large data set can lead to a neural network overfitting to the training data, especially if certain categories of speakers are overrepresented in a training data set. On the other hand, it is important to ensure that a range of samples are used to train a neural network in order that the neural network is able to distinguish between a wide variety of different speakers and to ensure that a trained neural network model is able to handle environmental noise in speech samples during authentication.

As a consequence of the problems in the data used during training, the performance of a trained neural network is often negatively impacted.

These problems and others are addressed by aspects of the present invention. For authentication to be reliably performed, the process must ensure a minimum accuracy level while keeping within the often conflicting constraints and often conflicting objectives of size, power consumption and speed.

SUMMARY

According to a first aspect of the invention, a method of determining a biometric signature of a user for use in authentication using a neural network. The method comprises: receiving a plurality of biometric samples from a user; extracting at least one feature vector using the plurality of biometric samples; using the elements of the at least one feature vector as inputs for a neural network; extracting the corresponding activations from an output layer of the neural network; and generating a biometric signature of the user using the extracted activations, such that a single biometric signature represents multiple biometric samples from the user.

As explained above, existing methods of biometric enrolment are unable to create a biometric signature that is robust enough to allow user recognition in a variety of environments. In contrast, embodiments of the first aspect of the invention allow for a biometric signature of a user to be determined that is robust to unimportant variations, which could include changes in the user's appearance or voice due to tiredness or illness and changes in environmental conditions, such as changes in lighting or ambient sounds.

This is achieved by taking multiple biometric samples from a user and using these to generate a single biometric signature of that user, which means that the biometric signature captures consistent identifying features of the user. By focussing on those identifying features that are consistent across the biometric samples, the biometric signature is robust to unimportant variations and noise and the accuracy of the neural network during authentication is therefore improved.

A related advantage is that, because the biometric signature is robust to a wide range of environmental noise, it is not necessary to identify a particular environment and account for the expected environmental noise during authentication. In addition to improving the speed of authentication and reducing the space and power requirements of the neural network, this means that the neural network is able to account for "unexpected" environmental noise. In contrast, previous approaches in which environmental noise is accounted for during authentication are unable to account for the noise present in new environments or variations in the noise present within a particular environment.

After receiving the plurality of biometric samples from the user the method may further comprise determining a signal to noise ratio of each of a plurality of biometric samples provided by the user and discarding one or more biometric samples with a signal to noise ratio below a predetermined threshold, and may in preferable embodiments further comprise discarding one or more biometric samples with a signal to noise ratio above a predetermined threshold.

As explained above, the method of the first aspect of the invention allows a biometric signature to be generated which captures identifying features of a user. If a sample has a poor signal to noise ratio, then the identifying features of the user may not be well captured in that sample in which case the sample is discarded. Although it may be counterintuitive to discard biometric samples with a high signal to noise ratio, in applications where environmental noise is likely to be present during authentication it may also be advantageous to generate the biometric signature of the user using samples which include at least a certain degree of noise.

In addition to or instead of filtering biometric samples using signal to noise ratio, other filters may be used. For example, in speaker recognition applications the biometric samples may be filtered based on the number of words in a recording, the amount of reverb in a recording, or based on whether other speakers are present in a recording.

Indeed, speaker recognition is a particularly advantageous implementation of the first aspect of the invention owing to the fact that vocal authentication is subject to a variations in both in the user's voice, for example due to tiredness or illness, and in environmental noise due to authentication taking place in the background of different types of ambient sounds. As such, the biometric samples are vocal samples in many embodiments of the invention.

When using vocal samples, after receiving the plurality of biometric samples from the user the method preferably further comprises normalising the biometric samples, with the normalisation of the biometric samples typically comprising normalising the volume of the samples.

In order to improve the robustness of the biometric signature to variations in environment noise, it is preferable if at least two of the plurality of vocal samples include environmental noise representative of different environments. However, the method may comprise a further step of adding artificial noise to one or more of the plurality of biometric samples.

As noted above, the biometric signature is generated using the extracted activations from an output layer of the neural network and, as will be explained in more detail below, authentication of a user will typically comprise a comparison between a stored biometric signature and an output vector generated using the activations during the authentication from said output layer of the neural network. The biometric signature therefore represents the outputs that would be expected from the output layer of the neural network in response to the user providing a biometric sample.

One way to generate the biometric signature that is useful when the neural network is used for speaker identification is to concatenate the recordings which form two or more of the vocal samples into a single recording and to then extract a feature vector from this concatenated sample. In order to ensure the samples are equally represented, this approach typically involves pre-processing steps such as volume normalisation. However, the pre-processing steps may also be used to vary the weighting given to each sample, for example by varying the volume of different samples.

If all of the plurality of vocal samples are concatenated then there will only be one feature vector whose elements are used as inputs for the neural network. The corresponding activations are typically then extracted from the output layer of the neural network and the biometric signature generated by forming a vector using said activations.

It is possible for only some of the vocal samples to be concatenated, or for the samples in two or more groups of vocal samples to be separately concatenated. This could be based on metadata, such as the environment in which vocal samples were recorded in which case vocal samples recorded in one environment could be concatenated and vocal samples recorded in another environment could also be concatenated.

In an alternative approach which may be taken when either none of the biometric samples are concatenated or when only some of the biometric samples are concatenated, extracting at least one feature vector using the plurality of biometric samples comprises extracting a feature vector from each of the plurality of biometric samples; the steps of using the elements of the at least one feature vector as inputs for a neural network and extracting the corresponding activations from an output layer of the neural network comprise, for each feature vector, using the elements of said feature vector as inputs for the neural network and extracting the corresponding activations from an output layer of the neural network to generate a corresponding output vector; and the step of generating a biometric signature of the user comprises taking a weighted average of the plurality of output vectors.

This alternative approach allows greater importance to be given to some of the biometric samples through the use of a weighted average. For example newer samples may be given a higher weighting than older samples. This approach will also be preferable for biometric samples different from vocal samples where concatenation of samples is not appropriate, for example with facial recognition.

However, although a weighted average is typically preferable, the weights of the weighted average may all be equal, which is to say that a non-weighted average may be taken.

In order to improve the biometric signature, the user may be prompted to provide further biometric samples. This prompt may take the form of feedback to the user on whether further samples are required and, optionally, instructions for providing these samples. For example, in the case of voice authentication the instructions could include instructions on how best to position the user's device for taking a vocal sample.

The feature vector extraction may comprise using metadata associated with each biometric sample.

If the biometric samples are vocal samples, the feature vector extraction will typically comprise extracting low-level acoustic descriptors, such as mel-frequency cepstral coefficients (MFCCs).

The embodiments of the first aspect of the invention will often form part a method of authenticating a user. This method comprises: generating a biometric signature of a user according to any of the preceding claims; receiving a biometric sample from the user; extracting a feature vector from the biometric sample; using the elements of the feature vector as inputs for a neural network; extracting the corresponding activations from an output layer of the neural network to generate an output vector; comparing said output vector with the biometric signature of the user; and authorising the user based on the result of said comparison.

By providing an improved biometric sample the accuracy of this authentication process is improved. The speed of authentication may also be improved, for example by removing the need to account for environmental noise during authentication.

According to a second aspect of the invention, a method of selecting a set of biometric samples for use in training a neural network is provided. The method comprises: extracting an n-dimensional feature vector from each sample in an initial set of biometric samples such that each sample in the initial set has a corresponding representation in an n-dimensional feature space; assigning the samples in the initial data set to a plurality of categories using the n-dimensional feature vectors; generating a plurality of candidate sets of biometric samples by, for each candidate set, selecting at least one biometric sample from each of the categories; for each of the plurality of candidate sets of biometric samples, training the neural network using the candidate set of biometric samples and measuring the performance of the trained neural network; and selecting the candidate set of biometric samples with the best performance as the set of biometric samples for use in training the neural network.

By improving the data used to train the neural network, the embodiments of the second aspect of the invention improve the performance of that neural network. In the case of biometric samples, the performance of the neural network is determined based on how accurately different users can be distinguished. The problem with using an overly large dataset to train the neural network is that this can lead to the neural network overfitting to the data, thereby compromising its ability to distinguish between users not present in the training dataset. The neural network could also be under fitted to the training data if there is too much data in the training data set. This could occur if the volume of data makes it difficult to optimise the weights of the neural network. A related problem is that the training data may be unrepresentative of users, for example if a set of vocal samples contained significantly more men than women.

However, one of the reasons large training datasets are conventionally used is precisely because a small dataset may not be representative of the wider population. In the example of biometric authentication, this could result in a neural network which could not properly distinguish between different biometric samples. Using a smaller training dataset is, therefore, in many ways counterintuitive.

In order to address these problems, samples are selected from the initial set of biometric samples in a way that maximises variability of the samples in the subset. The principle behind this is that the variations between the categories will typically be more significant than the variations within the categories. The subset therefore captures the most important information from the initial data set, while unimportant information is discarded.

Put another way it is not necessary to include all samples in a category in order to capture the important features of the biometric samples in that category, and selecting just a portion of the samples in each of the categories therefore allows the size of the data set to be reduced, and overfitting to be avoided, whilst ensuring that the training data set is representative of a wide range of biometric samples.

In addition to improving the performance of the neural network, the method of the first aspect also allows for training to be carried out in a shorter timeframe, owing to the smaller dataset used in training.

Assigning the samples in the initial data set to a plurality of categories preferably comprises clustering the n-dimensional feature vectors, for example by using k-means clustering or hierarchical agglomerative clustering. The method may also comprise a step of dimensionality reduction prior to the clustering, although this is not necessary in many applications of the invention for reasons that are discussed later.

As with the first aspect of the invention, the feature vectors can be extracted in a number of different ways. In some embodiments, extracting an n-dimensional feature vector from a biometric sample comprises extracting low-level acoustic descriptors from said sample.

Examples of low-level acoustic descriptors that may be extracted are fundamental frequency, duration, dynamic range, signal energy, mel-frequency cepstral coefficients, and filter banks. Filter banks are a set of band-pass filters applied over the speech signal, each of which operates on a frequency band of the signal. The size of the set can vary, but around 30 filters has been found to provide good results. The entries of resulting vector indicate how much energy was captured in that particular band (i.e. the value for the first entry corresponds to the amount of energy captured in the first band, the value in the second entry to the energy captured in the second band, and so on).

Filter banks are usually applied after the signal has been converted into a mel-scale, which is a logarithm of the frequency, and the mel-frequency cepstral coefficients (MFCC) are then values that are then derived using filter banks. These MFCCs essentially model the shape of the vocal tract at the time of production. They are obtained by applying the Fourier transform twice: first to overlapping frames of the speech signal (which is one way to apply filter banks), then a second time to the log of the mel-filter banks to arrive at the MFCCs. The advantage of using MFCCs is that this allows a representation of the physical acoustic signal to be obtained which corresponds to the vocal tract, which varies between individuals. Conversely, as filter banks are an algorithmic precursor to MFCCs they can potentially contain more information and may therefore be more appropriate.

In still further embodiments, extracting an n-dimensional feature vector from a biometric sample comprises extracting metadata from said sample. Such metadata could include one or more of age, gender, accent, native origin, native language, height, weight, disability, recording environment, and emotion, provided as labels to the biometric samples.

Another feature that could be represented in the feature vector could be speaking rate.

The method may further comprise a step of augmenting the initial set of biometric samples, said augmenting comprising adding one or more of artificial noise, reverberation, or speaker voice characteristics to one or more of the biometric samples. For example, the augmentation can include artificially changing the speed or tempo of the recording or artificially changing the fundamental frequency to be flat or within a different range.

By augmenting the data set, it is possible to ensure that the training data encompasses a useful variety of biometric samples. For example, in the case of speech authentication this would allow a wide variety of voice types and a wide range of environmental noise to be captured.

Measuring the performance of the trained neural network preferably comprises calculating one or both of the cross-entropy of the trained neural network and an equal error rate associated with the trained neural network.

The cross-entropy is typically calculated during training of the neural network by comparing the output of a softmax layer with the ground truth for each sample in the candidate dataset. When cross-entropy is used as the performance metric, the best performing candidate dataset is the candidate dataset for which the trained neural network has the lowest cross-entropy.

The equal error rate is typically calculated by enrolling a speaker from a control dataset, the control dataset comprising different samples from the samples in the initial set of biometric samples. The false acceptance and false rejection rates are then calculated using the other samples in the control dataset and used to calculate the equal error rate of the authentication decisions of the trained neural network. As the authentication decisions are directly associated with the trained neural network, this equal error rate is likewise associated with the trained neural network and can therefore be used as a performance metric. When equal error rate is used as the performance metric, the best performing candidate dataset is the candidate dataset for which the trained neural network has the lowest associated equal error rate. Since the same control dataset is used to calculate an equal error rate associated with each of the trained neural networks, the associated equal error rates are directly comparable.

BRIEF DESCRIPTION OF THE DRAWINGS

The invention will now be described with reference to the figures, in which:

FIG. 4b is a flow chart which completes the method of data selection illustrated in FIG. 4a.

DETAILED DESCRIPTION

As explained above, the performance of a neural network can be improved by improving the data used to train that neural network and also by implementing improved methods of enrolling a new user. The reasons for this are best understood by considering how the steps of training and enrolment impact on the performance of a neural network during authentication.

During the process of authentication, a user attempting authentication will provide a biometric sample which is then processed to generate a biometric signature. This biometric signature is then compared with the biometric signature of an authorised user, and if the two signatures match then authentication is successful. If, however, the two signatures do not match then authentication fails. The terms biometric signature and user profile may be used interchangeably herein.

In order to improve the accuracy of a neural network that is used to carry out this process it is necessary to reduce the number of occasions on which authentication fails for an authorised user and on which authentication succeeds for a non-authorised user. One way to achieve this is to improve the ability of the neural network to distinguish between different users by improving the data used to train the neural network, and methods for doing this are discussed in more detail later on with reference to FIGS. 4a and 4b.

Another way to improve the accuracy of a neural network used for biometric authentication is to improve the biometric signature of the authorised user, so as to ensure that the biometric signature is robust to natural variations that occur when a user provides a biometric sample. Natural variations in a user's biometric information may be caused by a number of different factors depending on the type of biometric information being used. For example, for vocal information, the user's mood, location or time of day can affect the user's voice. If images of the user's face are being used, then these could vary according to the lighting conditions of the user's environment, whether the user is wearing glasses, a face mask, or headphones, or even if the user is with or without facial hair or make up.

Embodiments of the present invention achieve this by achieved by improving the enrolment process used to generate that biometric signature, specifically by generating a single biometric signature that represents multiple samples from the user in different environments, thereby accounting for natural variations occurring in a user's biometric information. By generating a biometric signature that captures features of the user's biometric data which are consistent in all settings, the authentication of a user in a variety of settings is improved.

Figure 1:
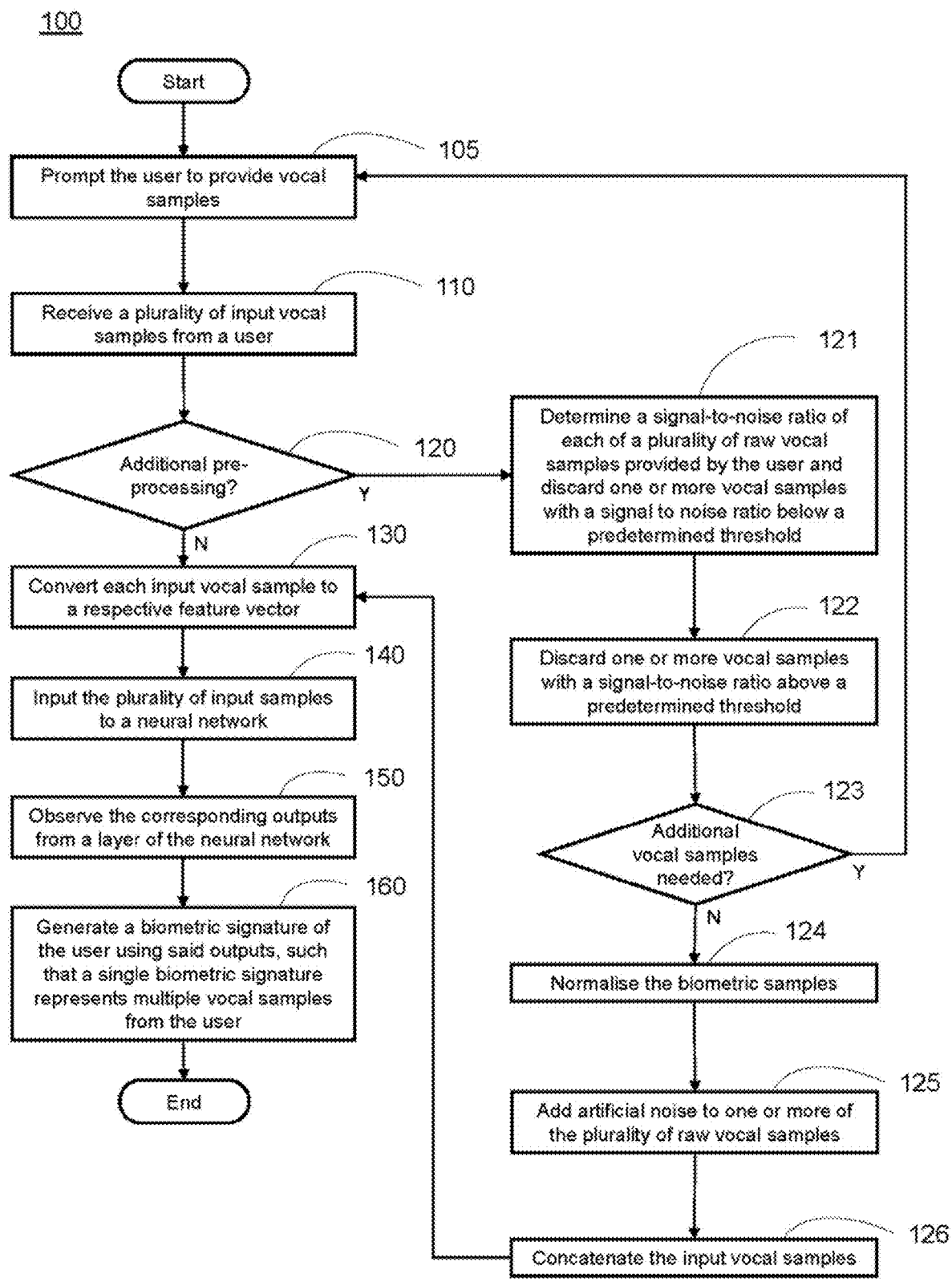
FIG. 1 is a flowchart illustrating a method of user enrolment according to the invention.

One embodiment of a method of generating a biometric signature of a user is illustrated by flowchart 100 in FIG. 1. The steps of flowchart 100 show the specific embodiment of generating a biometric signature for a user's voice, but the steps are widely applicable for generating a biometric signature using other biometric information of the user, such as for use in facial recognition.

The user is first prompted, by their device, to provide vocal samples at step 105, which are then received in step 110. The vocal samples are each received by a microphone in a user's device and stored locally in a suitable format, for example a .wav format may be used. The vocal samples will typically be of fixed duration, for example 10 seconds.

After receiving the plurality of vocal samples, there are a number of optional pre-processing steps that can be performed on the vocal samples with the aim of further improving the quality of the generated biometric signature, as shown in steps 120 to 126 of FIG. 1. It should be noted that although it can be advantageous to include all of steps 121 to 126, any combination of one or more of these steps could be included in embodiments of the invention.

The first optional pre-processing step 121 is to determine a signal-to-noise ratio (SNR) for each of the plurality of biometric samples, typically by using a classifier. In the context of the present invention, a classifier is a function that acts on a vocal sample, and outputs a characteristic of that vocal sample. For example, the P.563 classifier acts on a vocal sample to provide objective information regarding the voice quality of the recording.

Vocal samples found to have an SNR below a certain predetermined threshold may be discarded, as they may contain too much noise to make a meaningful contribution to the biometric signature. In addition to discarding vocal samples with an SNR below a predetermined threshold, vocal samples with an SNR above a predetermined threshold may also be discarded, as shown at step 122. While it may initially seem counter-intuitive to discard vocal samples with a high SNR value, since the biometric signature to be generated needs to be able to account for noise in the user's environment during authentication it has been found that in some instances it is advantageous to generate a biometric signature using vocal samples with a degree of noise.

In the event that additional vocal samples are required, either because insufficient samples were provided by the user or to replace discarded vocal samples, then the process may return from step 123 to step 105 where the user will be prompted to provide supplementary vocal samples. The SNR of the replacement vocal samples can be determined, and the user may again be prompted to provide additional samples if any are found to have an SNR above or below a predetermined threshold.

As part of the pre-processing, the user may also be prompted to provide metadata for the vocal sample, such as information about the user's device, the time of day, the user's mood and location. The metadata could also be determined automatically by analysing the device's system information, clock and inbuilt GPS. The metadata is not directly used in generating the biometric signature, but rather contributes to the determination of whether additional vocal samples are required in step 123.

Another optional pre-processing step which may contribute to the determination of whether additional vocal samples are required in step 123 involves employing security and privacy countermeasures to ensure that the received vocal samples have not been artificially generated. For example, liveness detection and anti-spoofing countermeasures may be used to determine if the vocal sample has been artificially generated. If it is determined that one or more of the vocal samples are artificial then the user may be prompted to contribute additional vocal samples, although in other implementations the enrolment process may be aborted.

Once it has been determined in step 123 that no additional vocal samples are required, the process continues.

The next optional pre-processing step is to normalise the volume of the vocal samples at step 124. This is typically achieved using a classifier, such as SV56, which normalises the decibel levels in the data. This normalisation step allows for like-for-like comparisons, whether between a plurality of vocal samples, or between different segments of a single concatenated vocal sample. The use of concatenated voice samples is discussed below.

As has already been explained, embodiments of the invention involve generating a single biometric signature that represents multiple samples from the user in different environments. To this end, it is preferable for at least two of the plurality of input vocal samples to include environmental noise representative of different environments. In a typical case, one environment could be the user's home, while another could their workplace. Equally, the different environments may be the same place at different times, such as the user's home on a weekday, and the same home on the weekends. To ensure that different environments are present in the vocal samples, in preferable embodiments the user will therefore be prompted to provide vocal samples while they are in different environments, and the environment of each sample may be recorded in metadata for that sample.

However, it may not always be possible for the user to provide vocal samples in different environments. Some embodiments therefore include a step 125 of adding artificial noise to one or more of the plurality of vocal samples. In practice, this may be achieved by using preset templates that correspond to the noise profile of different environments, and superimposing these onto the vocal samples. This step may be provided as an alternative to step 122 in cases where it would be advantageous for the samples to each have a certain degree of noise, but the steps could also advantageously be provided in combination.

The last optional pre-processing step shown in FIG. 1 is to concatenate the input vocal samples, as shown at step 126, to produce a single vocal sample, with the start of one vocal sample immediately following the end of the previous vocal sample. For example, the .wav files of six 10 second long vocal samples could be concatenated to form a single 60 second long .wav file.

Figure 2:
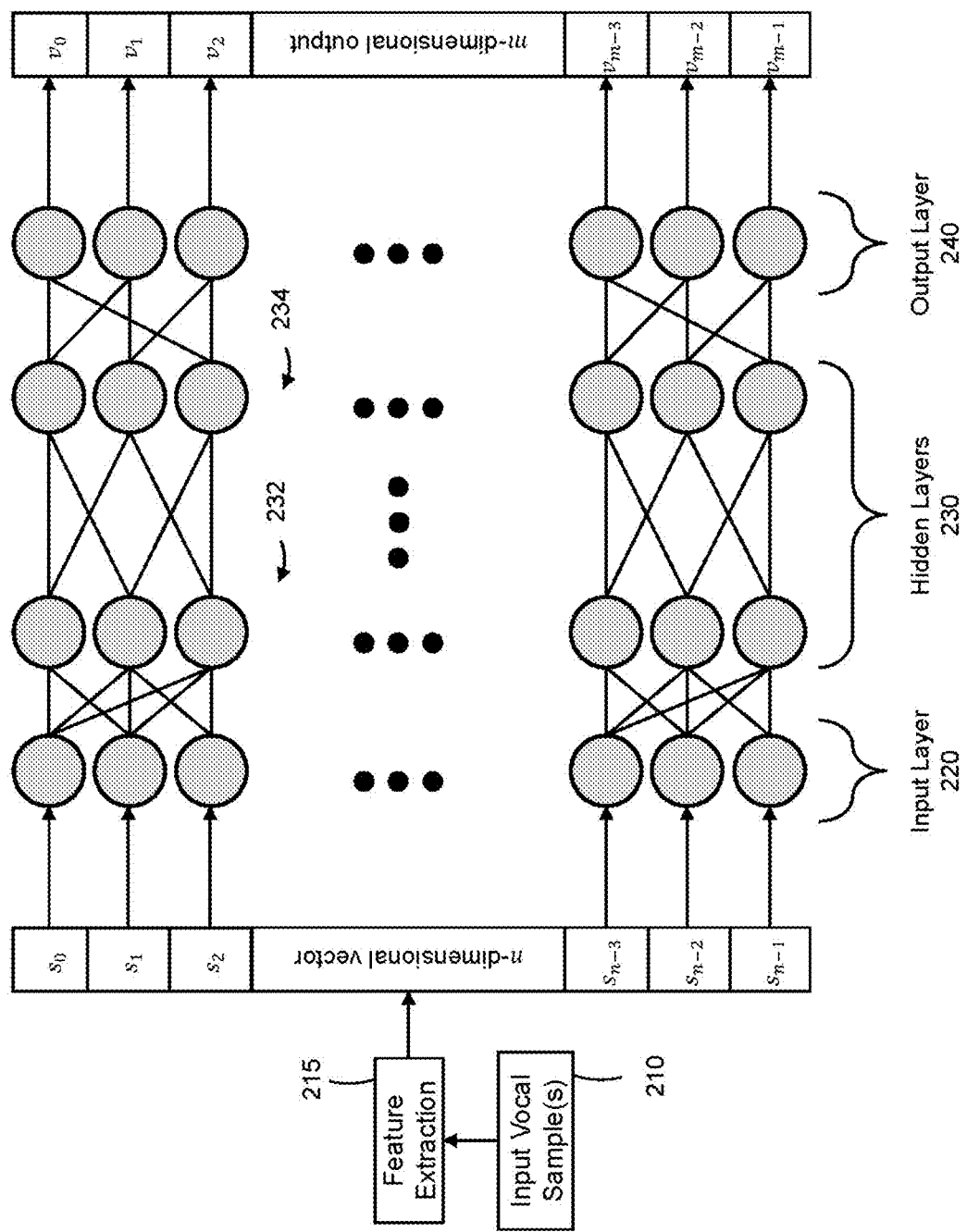
FIG. 2 is a schematic diagram of a neural network suitable for implementing aspects of the present invention.

The step of concatenating the samples relates to how the samples are used as inputs to the neural network. It is therefore useful at this point to describe an example of a neural network to which the present invention is applied, which is illustrated in FIG. 2 of the drawings.

A vocal sample 210 which is to be input to a neural network, possibly subject to one or more pre-processing steps, is first converted to an n-dimensional vectorial representation 215 of the vocal sample, which is referred to as a feature vector. In embodiments of the present invention, feature extraction is preferably performed by determining the mel-frequency cepstral coefficients (MFCCs) of a vocal sample.

Each element of the n-dimensional feature vector is input into a different node of the input layer 220. For example, as illustrated in FIG. 2, for a vector, element $s_0$ provides the input for one node in the input layer, and element $s_1$ provide the input for the next node, and so on until $s_n$. The n nodes of the input layer each pass their received input to one or more nodes of the first hidden layer 232. The channels between nodes are illustrated as straight lines in FIG. 2, although it must be emphasised that these channels are merely illustrative and the nodes may be connected differently.

The nodes of the neural network perform a weighted sum of the values provided as inputs, and may additionally add a bias, in the form of a scalar value, to the result of the weighted sum. The total result from each node is then passed to an activation function, which in turn determines if the result from a particular node is propagated to the connected nodes in the next layer. Nodes which pass data to the next hidden layer are known as activated nodes. Accordingly, activated nodes in the first hidden layer provides data to nodes in the second hidden layer 234. Although only two hidden layers 230 have been shown in FIG. 2, there may be any number of hidden layers, with the process of the results from activated nodes being propagated to the connected nodes in the next layer continuing until the output layer has been reached. It should also be noted that there will typically be a different number of nodes in each layer of the neural network. Examples of hidden layers used in the neural network include a convolution layer, a TDNN layer, a statistics pooling layer and a full-connected layer. As discussed above, however, a neural network which is to be stored and run on-device is subject to constraints. These constraints limit the number of layers as well as the dimensionality. Since layers act to downsample the input vectors, the number of layers and dimensions in on-device scenarios means that the network must be as accurate as possible using as little input data as possible. Further, to ensure that the size of the neural network is kept as small as possible, after training the neural network, the final layer, which is usually a softmax layer, is usually discarded. Then, when the neural network is used on-device, the layer of the neural network which was initially before the final layer is repurposed as an output layer. That is to say, the neural network is truncated to a certain size, and the activations of the final layer of the neural network after truncation are used as the outputs of the neural network.

The output layer 240 in FIG. 2 has m nodes, with each node of the output layer 240 respectively providing one element of the m-dimensional output. This m-dimensional output is taken as the biometric signature corresponding to the input vocal sample 210.

This same process of generating a biometric signature corresponding to an input vocal sample 210 is carried out when the neural network is being trained, when a user is being enrolled, and during authentication, but how that biometric signature is then used is different in each case, with the use of the biometric signature during user enrolment having been discussed above.

The process of training a neural network will vary depending on the training strategy that has been adopted, but the general principle is that the items in a training data set are provided as inputs to the neural network, and the outputs are then used to adjust the weights and biases in the weighted sums performed by each node of the neural network. For example, in the present case the training of the neural network 200 could be based on maximising the variability in the biometric signatures corresponding to each vocal sample in the training data set.

In contrast, enrolment occurs once the neural network has been trained, and the plurality of vocal samples provided by the user need to be used to generate a single biometric signature of the user. There are three main ways to achieve this.

The first way to generate the biometric signature is to convert each of the vocal samples into a respective feature vector in step 130, use the elements of that feature vector as inputs to the neural network in step 140, and to then extract the outputs from the neural network for that feature vector in step 150. As discussed above, the output layer of the neural network will produce m outputs, and these will form an m-dimensional output vector. This is repeated for each of the plurality of vocal samples to generate a corresponding plurality of m-dimensional output vectors.

Finally, in step 160 an average of the plurality of output vectors is taken to generate the biometric signature of the user. This average could be a simple mean, but in many cases a weighted average is used. In some embodiments, for example, the weights are determined according to the quality of the input voice sample, which may be determined using the P.563 classifier, with output vectors corresponding to higher quality vocal samples given greater weight than output vectors arising from lower quality vocal samples. The weights may also be determined according to the input metadata.

The biometric signature generated in this way therefore represents multiple biometric samples from the user in different environments.

The second way to generate the biometric signature is to first concatenate the vocal samples, as indicated in step 126, with the concatenated vocal sample used as the only input to the neural network. This concatenated vocal sample is converted to a feature vector in step 130 and its elements are used as inputs to the neural network in step 140. The outputs from the neural network are then extracted in step 150 and, as a single input has been used, this is taken directly as the biometric signature of the user in step 160. As there is no final step of averaging output vectors, if the vocal samples are to be weighted then this could be done by varying the normalisation process.

The benefit of concatenating samples is that there is also a process of averaging that occurs internally to the neural network architecture as a consequence of the weighting of the nodes. The global features represented by that averaging process are then the same across all of the samples that were concatenated together. This method is therefore preferable if all of the samples are collected in the same environment and the user's voice does not vary much during the day. However, in most cases it will be preferable not to concatenate all of the samples.

This leads to the third approach, which is to group the vocal samples, for example based on recording environment or the time of day they were recorded, and to concatenate the samples within each group.

In embodiments where samples are concatenated, either when all samples are concatenated or when samples are concatenated within groups, the samples may be concatenated as they are received from the user. Alternatively, each time a new vocal sample is received, the process of concatenation may be repeated from scratch, which means that older vocal samples which are identified as being less viable in light of newly received vocal samples can be discarded if appropriate. For example, a previously received vocal sample may be discarded if it is very similar to a newly received vocal sample, but the newer vocal sample is a higher quality recording. Another benefit to repeating the concatenation from scratch is that the order in which the vocal samples are grouped may affect the performance of the neural network. Therefore, to achieve better performance, the concatenated voice sample may be reordered.

In the embodiment discussed above, the samples used for enrolment are received from the user in step 110. In addition to this, in some embodiments of the invention the vocal samples received from the user are used to train the text-to-speech system to synthesise vocal samples of the user which are then used in the enrolment method. These synthetic vocal samples are processed in the same way as the authentic vocal samples. Although the neural network used for authentication is not configured to recognise speech, it is nevertheless advantageous to provide a wider variety of utterances, for example using any number of words and with any content.

A separate voice conversion system may augment one or both of synthesised and authentic vocal samples to include emotions such as happy, sad, or angry in the synthesised samples. The voice conversion system may also be comprised in the text-to-speech system.

Because the text-to-speech system is specifically configured to generate new vocal samples and the voice conversion system is specifically configured to augment vocal samples, the synthesised vocal samples accurately represent the user and therefore allow for further samples to be included in the enrolment of the user, thereby improving the performance of the neural network.

Figure 3:
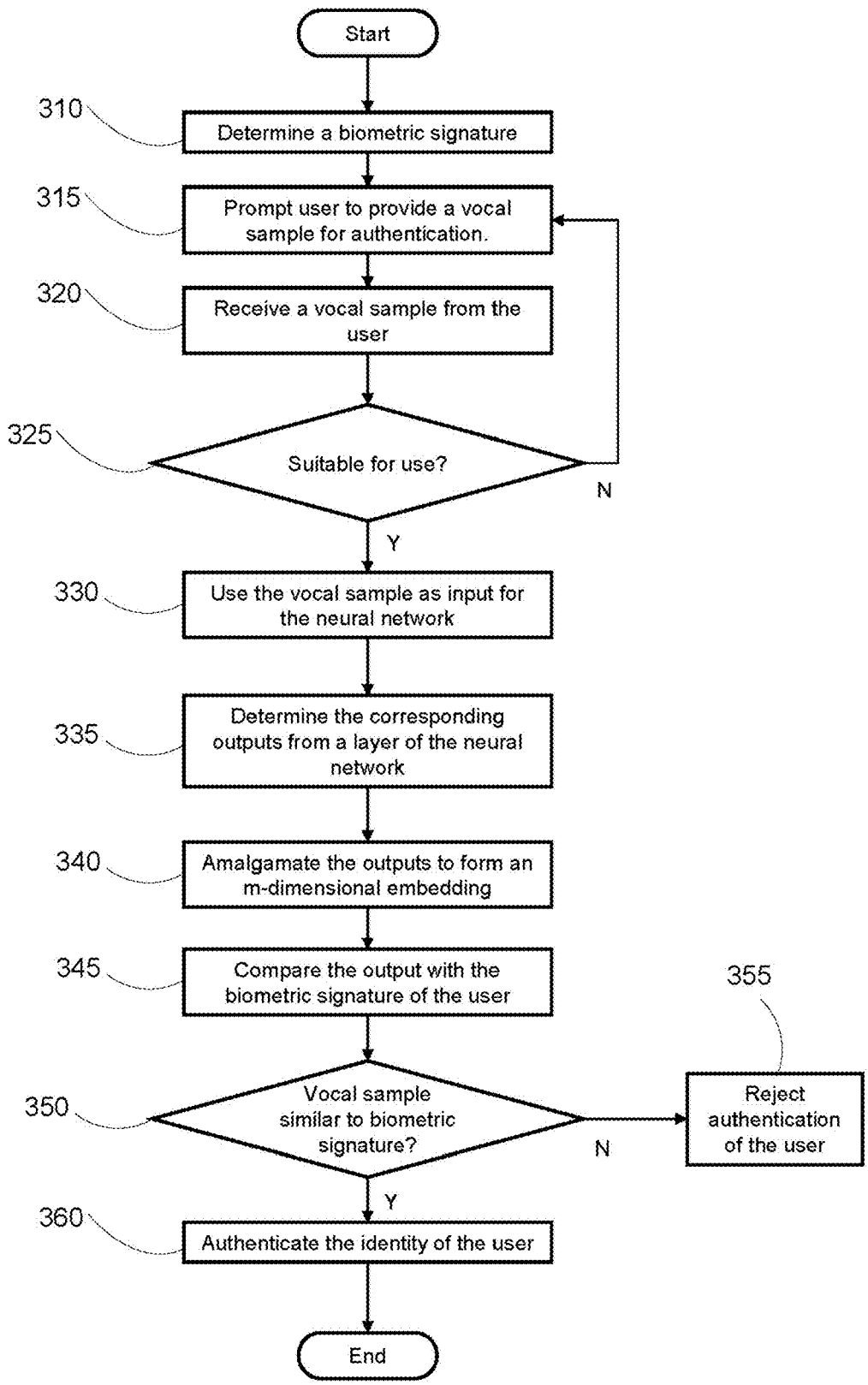
FIG. 3 is a flowchart illustrating a method of authenticating the identity of a user according to the invention.

The biometric signature generated in the embodiments of the present invention may be used in a method of authenticating a user provided according to the present invention, an embodiment of which is illustrated by the flowchart 300 shown in FIG. 3.

After generating a biometric signature for the user in step 310, typically according to the method shown in FIG. 1, the biometric signature will preferably be stored on the user's device. This step does not need to be repeated each time authentication occurs, although the biometric samples provided during successful authentications may be used to update the biometric signature.

From the user's perspective then, authentication will begin with step 315 in which they are prompted to provide a biometric sample for authentication. For simplicity we refer to the preferred embodiment in which this is a vocal sample, but as noted above the method is equally applicable to other forms of biometric authentication.

In step 320, a vocal sample is received from the user in response to the prompt given in step 315. The vocal sample provided to authenticate the identity of the user may be referred to as a "live vocal sample". Then, in step 325, it is determined if the live voice sample is suitable for use. For example, the SNR of the sample may be checked to ensure the sample is not too noisy, with samples below a threshold SNR discarded and the user prompted to provide a new sample in step 315. Other checks may also be performed, such as ensuring that the live vocal sample has a sufficient duration or ensuring that the live vocal sample has not been artificially generated.

In some instances, rather than prompting the user to provide a new vocal sample, the authentication process may end and further authentication attempts prevented for a period of time, for example leading to the user's device being locked. This could be the case where the user has provided too many samples which are unsuitable for use, or where security and privacy protections indicate that the vocal sample has been generated artificially.

Once a suitable vocal sample is received, in step 330 the vocal sample is used as an input to the neural network. This is done in the same manner as described above, by first extracting a feature vector and then using the elements of this feature vector as the inputs to the nodes in the input layer of the neural network. The outputs corresponding to the vocal sample are then extracted in step 335 to form an m-dimensional output vector which is to be compared to the biometric signature of the authorised user in step 340.

In step 345 the output vector of the neural network is compared to the biometric signature of the authorised user. As the output vector and the biometric signature of the authorised user are both n-dimensional vectors in an n-dimensional Euclidean vector space, one way to compare the two vectors is to determine the distance between them. This may be done using the Euclidean metric in n-dimensions:

$$d(a,b)=\sqrt{(a_1-b_1)^2+(a_2-b_2)^2+\ldots+(a_n-b_n)^2} \quad (1)$$

Taking the output vector as vector and the biometric signature of the authorised user as vector b, this equation gives a similarity measure the two which can be used to infer whether the authorised user is the user that provided the live biometric sample. The similarity measure is compared to a predetermined threshold in step 350.

If the similarity measure is above the predetermined threshold then the authentication is successful and the user is authorised in step 360, the user is authenticated based on the result of the comparison. The greatest acceptable distance which leads to authentication can be tuned according to the needs of the system, and the level of security desired. If, however, the similarity measure is below the predetermined threshold then in step 355 the authentication fails and the user is not authorised. Step 355 may redirect the user to step 315, or alternatively the authentication process may end and further authentication attempts prevented for a period of time, for example if too many failed authentications have occurred.

Instead of using the above Euclidean metric to compare the two n-dimensional vectors, another metric may be used, for example cosine similarity. Cosine similarity is calculated according to Equation 2, where A·B is the dot product of two vectors A and B, |A| is the magnitude of A, |B| is the magnitude of B, and cos θ is the cosine of the angle, θ, between A and B.

$$\cos\theta = \frac{A \cdot B}{|A||B|} \quad (2)$$

The value of cos θ ranges between −1 and +1, with a value of −1 indicating that the two vectors are oriented in opposite directions to each other and a value of +1 indicating that two vectors are aligned. Depending of the level of security desired, the threshold value required to positively authenticate the identity of the user can be adjusted.

The main difference between the two metrics is that the cosine similarity indicates only the degree to which the output vector and the biometric signature of the authorised user are aligned, whereas the Euclidean metric also indicates whether they are the same magnitude. It may be found that in some instances the relative orientation of these two vectors is more indicative of whether authentication should succeed than their relative magnitudes, in which case the cosine similarity is more appropriate. Other suitable similarity metrics are well known in the field.

According to the above described embodiments of the present invention, a user is able to perform biometric enrolment to generate a robust biometric signature that takes into account typical variations that their voice undergoes on a daily basis, and also factors in the environments that the user typically finds themselves in. This provides significant advantages in terms of security and robustness; the generated biometric signature will be usable by the enrolled user in situations where other biometric signatures may fail, such as on noisy trains. By generating a biometric signature according to the present invention, security is improved as the biometric signature is highly-tailored to the user's voice. Thus, third-party users would find it incredibly difficult to recreate the user's voice to the extent that it would compare favourably to the enrolled user's biometric signature.

By providing a biometric signature which represents multiple biometric samples from the user in different environments, the method of user enrolment provided in embodiments of the invention therefore improves the subsequent process of user authentication, thereby leading to improved performance of the neural network.

This improvement in performance may be achieved in neural networks which are unconstrained by storage space or power requirements, but is especially advantageous when such constraints do apply as it ensures a minimum accuracy level while keeping within the often conflicting constraints and often conflicting objectives of size, power consumption and speed.

Using a small neural network also poses challenges during training. Typically large volumes of data are used to train a neural network, but when that neural network is small the trained neural network may be over-fitted to the training data set, meaning that when the neural network is used to process unseen data it may produce an inaccurate result. Even in cases where the neural network is not over-fitted to the training data set, if there is too much data in the training data set the neural network could also be under-fitted during training. This could occur if the volume of data makes it difficult to optimise the weights of the neural network. A related problem is that the training data may be unrepresentative of users, for example if a set of vocal samples contained significantly more men than women.

In order to address this problem, embodiments of the invention provide a method of smart data selection which improves the training of a neural network. Since the problems discussed above also impact on the training of larger neural network, embodiments of this method have wider applicability than small neural networks such as would be stored and run on-device.

Figure 4A:
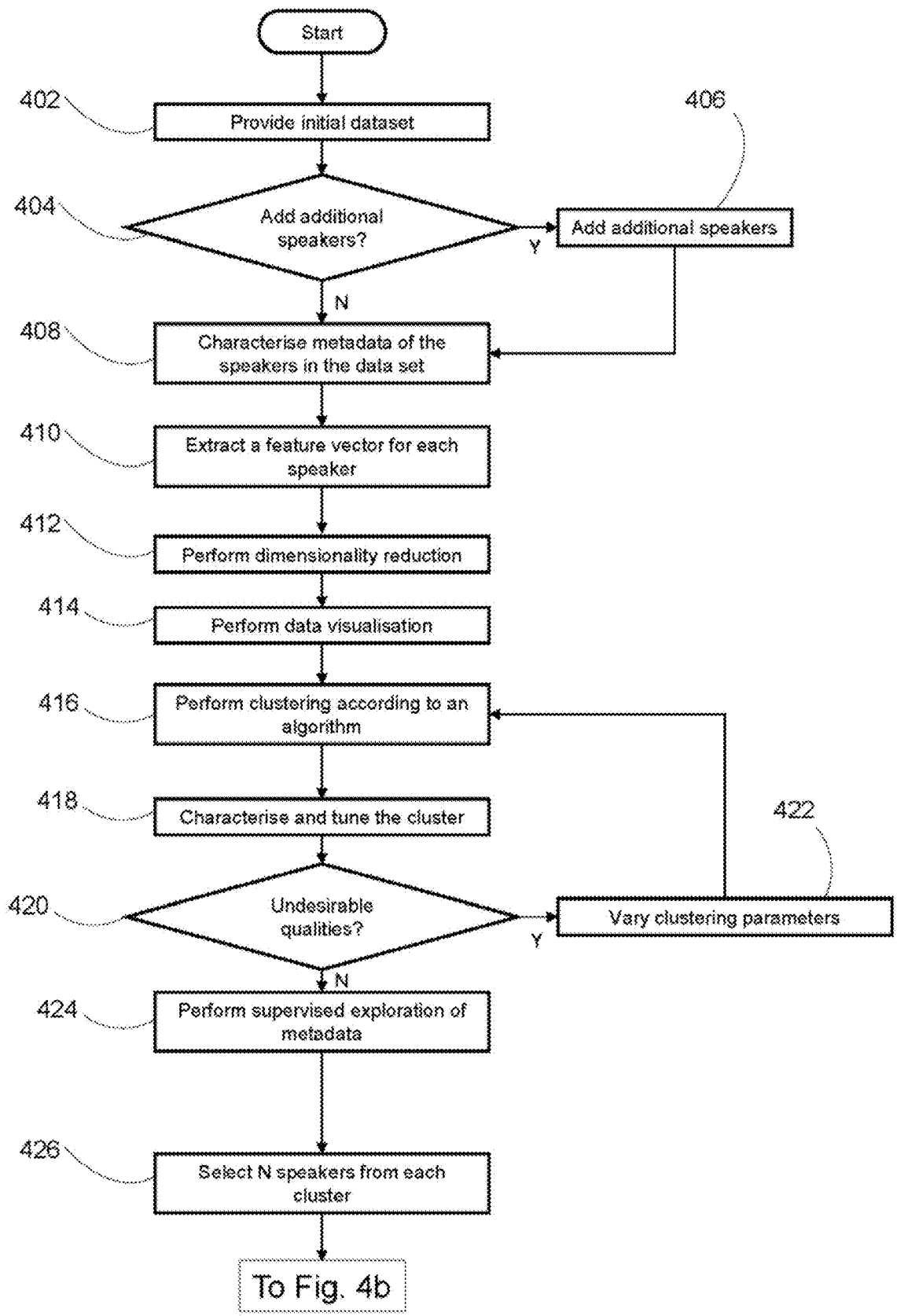
FIG. 4a is a flow chart illustrating part of a method for data selection according to the invention.
Figure 4B:
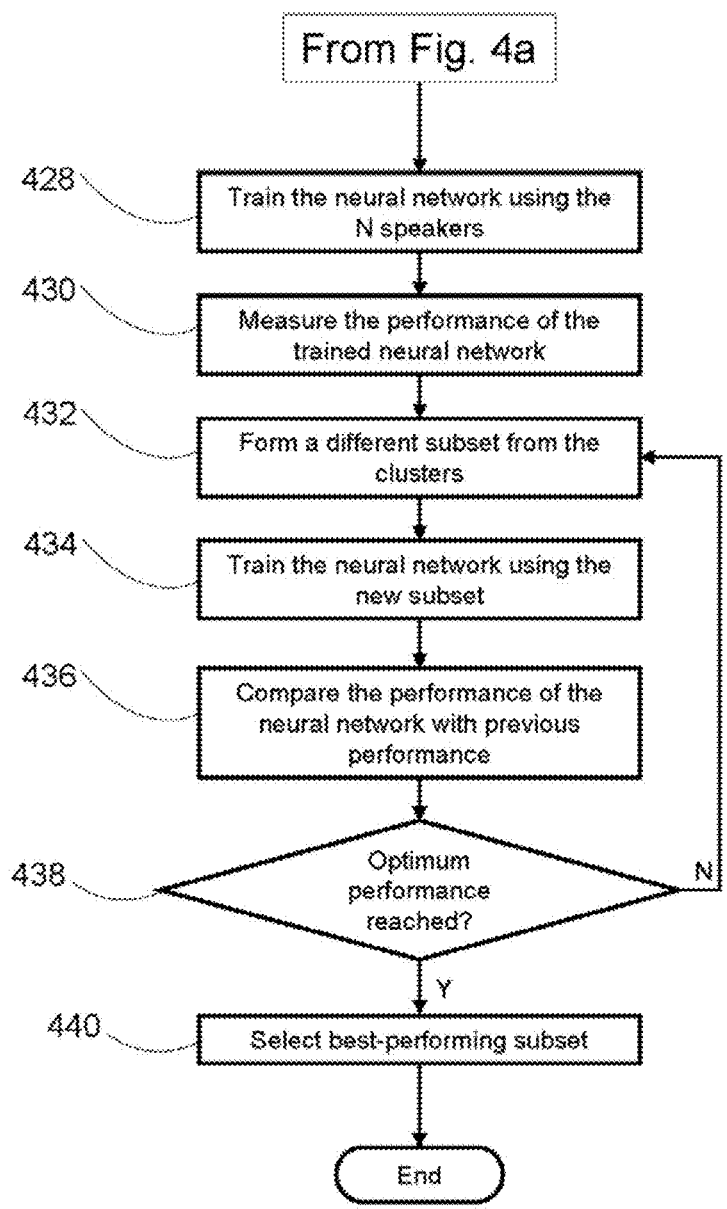

An embodiment of the method of smart data selection is shown in FIGS. 4a and 4b. Although the enrolment and authentication will typically be performed on-device in embodiments of the invention, the method of data selection is typically performed in the cloud, where computing resources are not so constrained. As with the embodiments of the invention discussed above, for simplicity we refer to vocal samples and speaker authentication, although the method of data selection is also applicable to other forms of biometric samples and biometric authentication.

Initially, in step 402, a large dataset of vocal samples is provided. Libraries of vocal samples and other speaker data such as VoxCeleb or LibriTTS are publically available, and can be used as a starting point for the method of data selection. Further, according to the needs of a user, the dataset may be supplemented with additional speakers, as shown in steps 404 and 406. Additional speaker data might come from another public library, or might be provided by users. For example, samples collected during enrolment and authentication of users could be used to re-train the neural network.

In step 410 an n-dimensional feature vector is extracted for each of the speakers in the dataset. This may be performed in the same way as for user enrolment or authentication, for example, by determining the MFCCs of each speaker's voice sample. However, it may be carried out using a cloud-based neural network which is not resource constrained. For example, a cloud-based neural network can be used to generate a biometric signature for each speaker which is then used to generate a feature vector.

Prior to step 410, the metadata of the speakers in the dataset may be analysed in step 408. This provides a breakdown of the number of unique speakers present in the dataset, according to the speaker's dialect, language, gender, age, or accent, among other forms of metadata. This metadata may then be used to extract the feature vectors.

Before clustering the data in the dataset into a plurality of categories in step 416, dimensionality reduction may be performed in step 412 to reduce number of dimensions in the feature space. Typically, the feature space is reduced from n dimensions to 2- or 3-dimensions using PCA or t-SNE. After dimensionality reduction, a further step 414 of visualising the data in a 2- or 3-dimensional vector space may be carried out to verify that the speakers in the data set are "separable", that is that a wide variety of different vocal types are present in the data set.

However, in many cases it is not necessary to carry out dimensionality reduction. While the so-called curse of dimensionality means that it is not possible to identify meaningful clusters in some forms of data without dimensionality reduction, the nature of biometric samples is that users are often highly clustered even at higher dimensions. For example, although the features extracted from vocal samples will typically not correspond to identifiable characteristics such as age, gender, nationality, and so on, the high number of such characteristics which each lead to distinct clusters of speakers in a dataset means that speakers will still be meaningfully clustered in a higher dimensional feature space.

Clustering is preferably performed using k-means clustering. To perform k-means clustering, the value of k is first specified by a user, where k corresponds to the number of clusters in the data. The value of k may be adjusted at a later stage if the result of a k-means clustering algorithm, does not yield satisfactory results. This will be discussed below. An arbitrary, initial centre point is then selected for each cluster and the points in the feature space—which in this case correspond to the feature vectors extracted from the vocal samples in the data set—are each assigned to the nearest centre point to form initial clusters in the data. The mean is then taken of the points in each of the initial clusters to identify new centre points and the process is repeated with the new centre points. Each iteration will lead to some of the points in the feature space being assigned to a different cluster from the previous iteration, until the final iteration when the clusters remain unchanged, at which point the process stops.

Alternatively, hierarchical agglomerative clustering may be used. Typically, this is carried out in stages by clustering points in the feature space which are within progressively greater distances of each other. For example, the first stage could be to cluster all data points for which the Euclidean distance shown in equation (1) is below 1, the second stage to cluster all points for which the Euclidean distance is below 2, continuing until all points have been clustered into a single cluster. This leads to a hierarchy of increasingly large clusters. The number of clusters to which the items in the data set are assigned can then be tuned depending on the level of granularity desired in the clusters. That is, the data can be clustered into fewer clusters, each with a larger proportion of the members in the dataset, or can be clustered into a relatively greater number of clusters, each with fewer members of the dataset.

Other methods of clustering could also be used, and although k-means clustering and hierarchical agglomerative clustering are both unsupervised methods it is also possible to use supervised methods, for example by using metadata of the speakers in a data set.

Once the clusters have been determined, they may be characterised and tuned in step 418. Characterising the clusters involves checking the number of speakers within a cluster, measuring intra-cluster variability and determining the distance between different clusters, which allows the clusters to be tuned to maximise the distance between different clusters and minimise the intra-cluster variability. Ideally, each cluster will have low variance within itself, and the various clusters will be distributed across the feature space.

At this stage, as indicated by step 420, if it is determined that different clusters are too close together, or that there is a high amount of intra-cluster variability, then the parameters used to perform the clustering are adjusted at step 422, and the clustering step 416 is repeated. In this sense, the process of clustering is iterative. The parameters that may be adjusted include the number of clusters, the perplexity value, and whether single-linkage clustering or complete-linkage clustering is used. The parameters may be varied any number of times until satisfactory clustering is achieved.

Once the clusters have been determined, the metadata of the speakers in each cluster is typically explored in step 424. Specifically, it is observed if there are dominant metadata features represented in individual clusters, for example using decision trees or association rule mining. In this way, the results of the unsupervised clustering can be compared with the metadata of the speakers in each cluster. It then becomes possible to determine if the clustering has grouped the data in any kind of meaningful way. For example, exploration of the metadata may reveal that the clusters have been performed according to the accents of the speakers in the dataset, or their gender. Although this step is not essential, it can be useful when selecting a subset of the dataset in step 426.

The selection of a subset involves selecting N speakers from the initial data set, where N is less than the size of the initial data set, with the speakers being sampled from each of the clusters. This sampling may be random, with a random number of speakers selected from each cluster, but the N speakers are preferably selected in such a way that the ratio of the speakers according to one or more items of metadata is preserved. For example, if the initial dataset had a gender breakdown of 50% male and 50% female, then this ratio would be preserved in the subset. However, if the initial dataset suffered from a major imbalance in a particular metadata feature, then that imbalance would not be preserved in the subset. In other words, an imbalance found in the dataset can be smoothed out by appropriately selecting the N speakers. In any case, an initial value for N is usually the same as the number of clusters in the dataset. Therefore, it is typical for 1 speaker to be selected per cluster. If k-means clustering is used, this means that initially N=k.

The value of N may be adjusted if the resulting subset does not yield a well-performing neural network, as is discussed in more detail below.

By selecting at least 1 speaker from each cluster, the resulting subset will represent the distribution of the dataset at large to a strong degree, while also being a fraction of the size. The advantage is that the subset can now be used to train a small neural network, with a much lower chance of overfitting or underfitting occurring. That is, the trained neural network can be used to accurately distinguish between different speakers.

After step 426, the method continue to step 428, shown in FIG. 4b, in which the neural network is trained using the subset, and the performance of the neural network is measured in step 430. At least one of two performance metrics are used in the embodiments of the present invention.

Although FIG. 4 shows steps 428 and 430 as distinct, the first performance metric is cross-entropy and is measured during training step 428. A softmax layer is used to normalize the activations from an output layer of the neural network to a probability distribution indicating the likelihood of whether a particular speaker provided a sample in the subset. This distribution is compared with the ground truth for each sample to give a value of cross-entropy for the neural network. During training, the weights of the neural network model are varied to minimise the cross-entropy, with the final cross-entropy taken as the indication of the performance of the trained neural network.

This performance metric indicates how well the neural network classifies speakers in the subset used during training in step 428, and as such also indicates how well a neural network trained using that subset distinguishes between different speakers.

The second performance metric is an equal error rate (EER). The EER is a value measuring the false acceptance and false rejection rate in authentication decisions, and in embodiments of the invention is measured using a control dataset distinct from the initial training dataset. The control dataset comprises several samples from each speaker represented in the control dataset. One or more samples corresponding to a speaker are used to enrol that speaker, and an enrolment algorithm such as is provided in embodiments of the present invention is used to generate a biometric signature for that speaker. The remaining samples in the dataset are then used to attempt authentications and the false acceptance and false rejection rates are then calculated and used to calculate the EER. This EER is associated with the neural network and can therefore be used as a performance metric. If the same control dataset is used to determine an EER associated with each of several neural networks, the EER associated with one of those neural networks can be directly compared with the EER associated with another of those neural networks in order to compare the performance of those two neural networks. In this way, it is possible to compare the performance of several neural networks using an equal error rate as a performance metric.

The benefit of using EER is that in some instances a neural network may have a low cross-entropy but a high associated EER.

Next, in step 432, a different subset is formed from the clustered dataset. The value of N may be varied if desired, but this is not required. The new subset may include speakers from a previous subset, or the subset could be formed of unique speakers, i.e. speakers not seen in a previous subset.

In step 434, the neural network is re-initialised, and then trained again from scratch, as in step 428. The performance of the neural network after training with the new subset is then assessed, as in step 430. In step 436, the performance of the newly trained neural network is compared with the performance obtained using the previous subset.

This process of forming a subset is repeated, with each iteration comparing the performance of the newly trained neural network with the performance obtained using previously obtained subsets in step 436, until performance is determined to have been optimised, as indicated by step 438. This determination can be based on a threshold of performance having been reached, by identifying that the performance of the best-performing subsets has converged, or simply by limiting the number of iterations carried out. The best-performing subset is then selected in step 440 for use in training the neural network.

In the case that cross-entropy is used to measure the performance of each trained neural network, the subset leading to the lowest cross-entropy is selected. Likewise, in the case that EER is used the subset with the lowest EER is selected.

In some embodiments, both performance metrics are used to select the best-performing subset in step 440. For example, a subset may be selected which leads to the lowest EER out of the subsets for which cross-entropy is below a predetermined threshold.

Afterwards, the experimental data, such as the various subsets used and the values of the parameters used for clustering is typically discarded. However, the experimental data may be kept, for example to analyse it at a later stage.

By using method of data selection provided according to embodiments of the invention, it is possible to train a small neural network with a relatively small amount of data, in a way that prevents the resulting model from being overfitted, or indeed underfitted, to the training data. Accordingly, a trained neural network stored on a user's device can be used to accurately authenticate a user, whereas previously this would have required a cloud-based solution.

Figure 5:
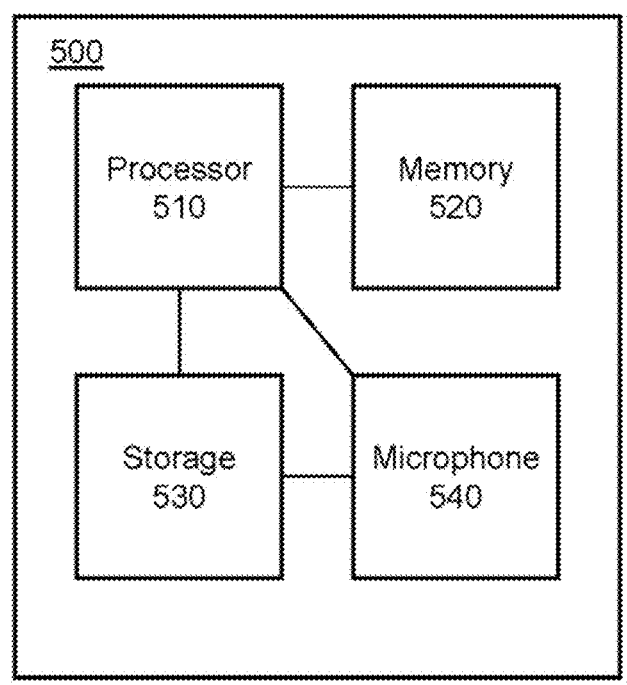
FIG. 5 is a schematic diagram of a device suitable for implementing aspects of the present invention.

An example device on which a neural network used to implement the embodiments of the present invention is illustrated by FIG. 5. The device 500 includes a processor 510, which is coupled to non-volatile storage 530, memory 520 and microphone 540. The microphone 540 is additionally coupled to the storage 530. Note that instead of or in addition to the microphone 540 the device 500 could include any other device used to collect biometric information of the user, such as a fingerprint scanner or a camera.

The invention claimed is:

1. A method of generating a biometric signature of a user for use in authentication using a neural network, the method comprising:
receiving a plurality of biometric samples from a user;
extracting at least one feature vector using the plurality of biometric samples;
using elements of the at least one feature vector as inputs for a neural network;
extracting corresponding activations from an output layer of the neural network; and
generating a biometric signature of the user using the extracted activations, such that a single biometric signature represents multiple biometric samples from the user;
wherein extracting the at least one feature vector using the plurality of biometric samples comprises extracting a feature vector from each of the plurality of biometric samples, resulting in a plurality of feature vectors; the steps of using the elements of the at least one feature vector as inputs for a neural network and extracting the corresponding activations from an output layer of the neural network comprise, for each feature vector from among the plurality of feature vectors, using the elements of said feature vector as inputs for the neural network and extracting the corresponding activations from an output layer of the neural network to generate a corresponding output vector, resulting in generation of a plurality of output vectors; and the step of generating the biometric signature of the user comprises taking a weighted average of the plurality of output vectors.

2. A method according to claim 1, wherein after receiving the plurality of biometric samples from the user the method further comprises determining a signal to noise ratio of each of a plurality of biometric samples provided by the user and discarding one or more biometric samples with a signal to noise ratio below a predetermined threshold.

3. A method according to claim 2, wherein after determining the signal to noise ratio of each of the plurality of biometric samples provided by the user the method further comprises discarding one or more biometric samples with a signal to noise ratio above a predetermined threshold.

4. A method according to claim 1, wherein the biometric samples are vocal samples.

5. A method according to claim 4, wherein after receiving the plurality of biometric samples from the user the method further comprises normalising the biometric samples.

6. A method according to claim 4, wherein at least two of the plurality of biometric samples include environmental noise representative of different environments.

7. A method according to claim 4, wherein after receiving the plurality of biometric samples from the user the method further comprises adding artificial noise to one or more of the plurality of biometric samples.

8. A method according to claim 4, wherein extracting at least one feature vector using the plurality of biometric samples comprises:
concatenating two or more of the plurality of biometric samples and extracting a feature vector from the concatenated sample; or
concatenating all of the plurality of biometric samples and extracting a feature vector from the concatenated sample.

9. A method according to claim 1, wherein weights of the weighted average are all equal.

10. A method according to claim 1, wherein the method further comprises a step of prompting the user to provide further biometric samples.

11. A method according to claim 1, wherein extracting a feature vector from a biometric sample comprises:
extracting low-level acoustic descriptors from said sample; or
extracting a feature vector from a biometric sample comprises using metadata associated with said sample.

12. A method of authenticating a user, the method comprising:
generating a biometric signature of a user, by:
receiving a plurality of biometric samples from a user;
extracting at least one feature vector using the plurality of biometric samples;
using elements of the at least one feature vector as inputs for a neural network;
extracting corresponding activations from an output layer of the neural network; and generating a biometric signature of the user using the extracted activations, such that a single biometric signature represents multiple biometric samples from the user;

wherein extracting the at least one feature vector using the plurality of biometric samples comprises extracting a feature vector from each of the plurality of biometric samples, resulting in a plurality of feature vectors; the steps of using the elements of the at least one feature vector as inputs for a neural network and extracting the corresponding activations from an output layer of the neural network comprise, for each feature vector from among the plurality of feature vectors, using the elements of said feature vector as inputs for the neural network and extracting the corresponding activations from an output layer of the neural network to generate a corresponding output vector, resulting in generation of a plurality of output vectors; and the step of generating the biometric signature of the user comprises taking a weighted average of the plurality of output vectors;

receiving a biometric sample from the user;

extracting a feature vector from the biometric sample;

using the elements of the feature vector as inputs for a neural network;

extracting the corresponding activations from an output layer of the neural network to generate an output vector;

comparing said output vector with the biometric signature of the user; and authorising the user based on the result of said comparison.

\* \* \* \* \*